Aug. 25, 1964

JAMES E. WEBB ADMINISTRATOR OF
THE NATIONAL AERONAUTICS AND
SPACE ADMINISTRATION

MEANS FOR CONTROLLING RUPTURE OF SHOCK TUBE DIAPHRAGMS

Filed Oct. 22, 1962

3,145,874

INVENTOR.
DONALD BAGANOFF
BY
ATTORNEYS

United States Patent Office 3,145,874
Patented Aug. 25, 1964

3,145,874
MEANS FOR CONTROLLING RUPTURE OF
SHOCK TUBE DIAPHRAGMS
James E. Webb, Administrator of the National Aeronautics and Space Administration, with respect to an invention of Donald Baganoff
Filed Oct. 22, 1962, Ser. No. 232,318
1 Claim. (Cl. 220—89)

This invention relates to means for controlling rupture shock tube diaphragms. A shock tube apparatus comprises essentially a compression tube and a low pressure tube separated by a rupturable diaphragm. In operation, the diaphragm is caused to rupture at some predetermined pressure, and the resulting propagation of a shock wave in the low pressure is utilized for various experimental and theoretical studies; such as physio-chemical research, gasdynamic studies, and aerodynamic studies, especially for supersonic research. It is essential that the diaphragm rupture at a predictable pressure.

An object of this invention is to provide a means which ensures precise control of the diaphragm rupture pressure, and which is adjustable to cause rupture of the diaphragm over a wide range of values for diaphragms of a given thickness and material.

A further object is to provide a knife structure disposed under the diaphragm and against which the diahpragm is forced so as to be cut, the position of the knife structure being axially adjustable to precise distances from the diaphragm to control accurately the diaphragm rupture pressure.

A further object is to provide a means for controlling the rupture of a shock tube diaphragm which ensures leafing of the diaphragm; that is, the diaphragm on rupture forms segments or leaves which remain attached and are not blown downstream to interfere with the test or research results.

A further object is to provide a means for controlling rupture of a shock tube diaphragm which permits use of a diaphragm formed of sheet stock without scribe lines or other prepared weakened lines or zones.

With the above and other objects in view, as may appear hereinafter, reference is directed to the accompanying drawings in which.

Figure 1:
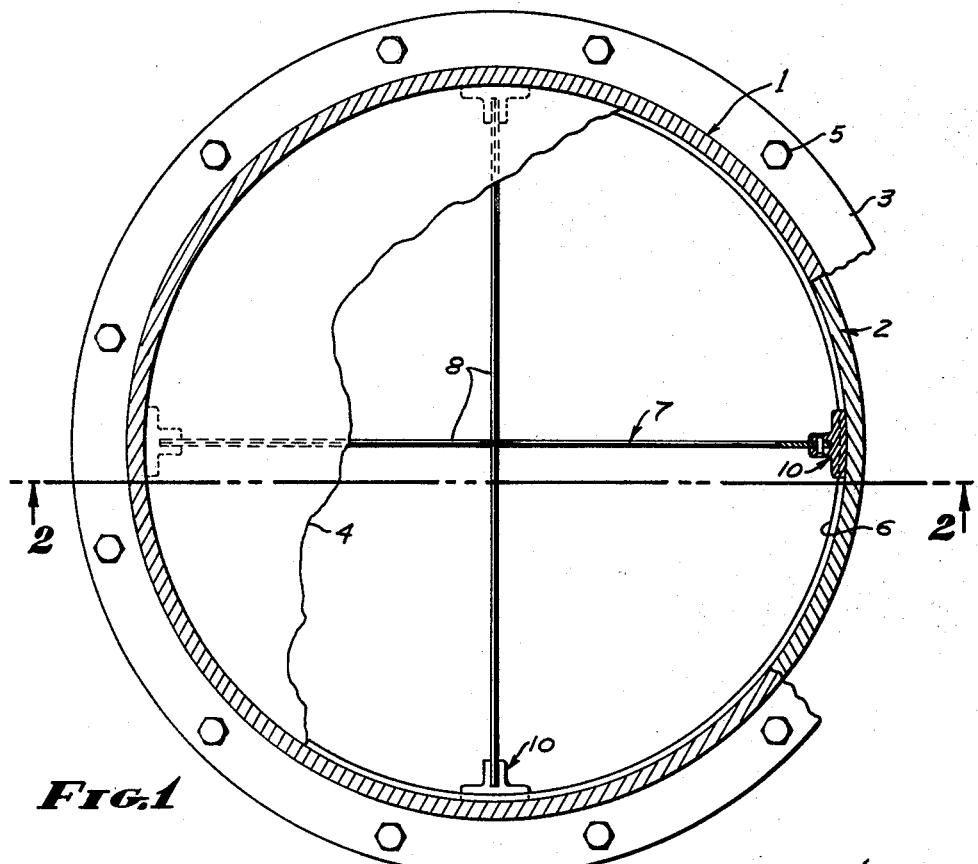
FIGURE 1 is a transverse, sectional view of a shock tube, showing the means for controlling rupture of the diaphragm and indicating the diaphragm itself fragmentarily, the section being taken substantially through 1—1 of FIGURE 2.
Figure 2:
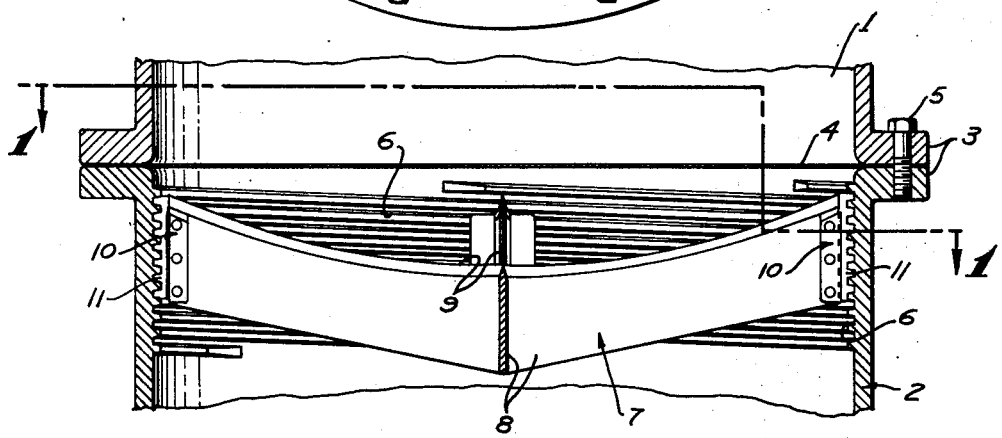
FIGURE 2 is a fragmentary, longitudinal, sectional view thereof, taken through 2—2 of FIGURE 1.

A shock tube comprises at least two sections, namely, an upstream tube section 1 and a downstream tube section 2. The two tube sections are provided with mating flanges 3 between which is clamped a diaphragm 4. The flanges 3 are secured together by bolts 5 or by more elaborate means, not shown, which permits quick coupling and decoupling of the section.

The downstream tube 2 is provided with internal screw threads 6 adjacent its flange 3. Inasmuch as the shock tube may be of relatively large diameter, the screw threads 6 may be of relatively large pitch.

Mounted within the downstream tube 2 is a knife structure 7 which includes a plurality of cutting blades 8 radiating from a common center. In the construction illustrated, four such blades are shown, disposed at right angles to each other. The number of blades, however, depends upon the diameter of the shock tube, the blades increasing in number as the diameter is increased. In other words, as few as three blades may be used, or six or eight blades may be used.

Each of the blades 8 is provided with a sharpened upper edge 9 which preferably curves upwardly from the center of the shock tube, that is, the blades 8 define a concave figure.

Each blade 8 is prodiced at its laterally outer extremity with an end fitting 10, which may be riveted or welded thereto and which includes at its laterally outer side a screw-threaded segment 11. The screw segments 11 of the end fittings 10 engage the internal screw threads 6 so that the knife structure may be adjusted axially on the downstream tube section 2.

Operation of the means for controlling rupture of shock tube diaphragms is as follows:

A diaphragm is used which is capable of stretching or ballooning substantially before rupture. Sheet aluminum or alluminum alloy serves this purpose. However, other sheet metal having lesser or greater strength may be used, depending upon the pressures employed in the upstream shock tube.

The knife structure 7 is located in such a position that the diaphragm will stretch downward into contact with the knife structure before it has been stretched beyond its ultimate strain. Further pressure causes the knife structure 7 to establish lateral lines of concentrated stress in the diaphragm until ultimately the diaphragm ruptures. On rupturing, the diaphragm forms segmental leaves which remain attached to the periphery of the diaphragm and fold downwardly against the walls of the downstream tube section 2.

Prior to the use of the shock tube for study or research purposes, the knife structure 7 is located at various predetermined positions in the downstream tube section 2, and a series of diaphragms formed of a given metal or alloy and thickness is caused to rupture. Careful record is made of the rupture pressure in each case, and the values thus established are used to calibrate the position of the knife structure 7 for subsequent tests. Such calibration is made useful by reason that the rupture pressure for a given location of the knife structure 7 and a diaphragm of given metal or alloy and thickness is remarkably consistent.

While a particular embodiment of this invention has been shown and described, it is not intended to limit the same to the exact details of the construction set forth, and it embraces such changes, modifications, and equivalents of the parts and their formation and arrangement as come within the purview of the appended claim.

What is claimed is:
A shock tube structure, comprising:
(a) a high pressure tube section;
(b) a low pressure tube section;
(c) a diaphragm clamped between said tube sections, said diaphragm being formed of sheet material capable of stretching, thereby to expand axially into said low pressure tube section on application of pressure in said high pressure tube section;
(d) internal screw-thread means extending circumferentially around and on the inner surface of said low pressure tube section adjacent said diaphragm;
(e) and a knife structure including a plurality of blades radiating from a common center and having sharpened upper edges curving upwardly from said center to define a concave surface, and peripherally disposed screw-thread means cooperative with said internal screw-thread means for effecting axial adjustment of said knife structure;
(f) said diaphragm adapted to stretch into contact with said edges prior to rupture, whereby said edges form cutting means to cause rupture of said diaphragm into predetermined segments retained by their peripheral margins between said tube sections.

References Cited in the file of this patent

UNITED STATES PATENTS

| | | |
|---|---|---|
| 1,415,216 | Bingay | May 9, 1922 |
| 2,095,828 | Nerad | Oct. 12, 1937 |
| 2,225,220 | Huff | Dec. 17, 1940 |
| 2,291,360 | Unger | July 28, 1942 |
| 2,304,417 | Mason | Dec. 8, 1942 |
| 2,320,211 | Bloom et al. | May 25, 1943 |
| 2,788,794 | Holinger | Apr. 16, 1957 |

FOREIGN PATENTS

| | | |
|---|---|---|
| 488,953 | Great Britain | July 18, 1938 |